United States Patent [19]

Korpela

[11] Patent Number: 4,976,107
[45] Date of Patent: Dec. 11, 1990

[54] PROCEDURE FOR IMPROVING THE EFFICIENCY OF A STEAM POWER PLANT PROCESS

[76] Inventor: Timo Korpela, Pohjantie 4 C, 02100 Espoo, Finland

[21] Appl. No.: 472,815

[22] Filed: Jan. 31, 1990

Related U.S. Application Data

[63] Continuation of Ser. No. 314,117, filed as PCT FI88/00097 on Jun. 16, 1988, abandoned.

[30] Foreign Application Priority Data

Jun. 18, 1987 [FI] Finland .................................. 872723

[51] Int. Cl.$^5$ ................................................ F23G 5/04
[52] U.S. Cl. ........................................ 60/670; 60/645; 110/224
[58] Field of Search .................. 110/224; 60/670, 643, 60/645

[56] References Cited

U.S. PATENT DOCUMENTS

| | | | |
|---|---|---|---|
| 3,835,650 | 9/1974 | Chesmejef | 60/670 X |
| 4,291,539 | 9/1981 | Potter | 60/670 |
| 4,414,813 | 11/1983 | Knapp | 60/670 X |
| 4,423,689 | 1/1984 | Merz | 110/347 |
| 4,516,511 | 5/1985 | Kuo | 110/346 |
| 4,656,955 | 4/1987 | Kuo | 110/346 |
| 4,750,434 | 6/1988 | Salter | |

Primary Examiner—Allen M. Ostrager
Attorney, Agent, or Firm—Steinberg & Raskin

[57] ABSTRACT

The invention concerns a procedure for improving the efficiency of a steam power plant process wherein damp fuel is used, which is dried by conducting at least part of the flue gas flow to a fuel drying process. In addition to the feed water the combustion air is preheated in steam power plants with tapped steams from the turbine, in counter-pressure power plants with tapped steams and/or counter-pressure steams, and in remote heating power plants with tapped steams and/or remote heating water. As taught by the invention, the temperature of the flue gas going to the damp fuel dryer installation (10), or the cooling of the flue gas flow by-passing it, is controlled by taking thermal energy from the flue gas and transferring it to the combustion air and/or the feed water, their quantity and/or temperature being controlled in accordance with the cooling requirements of the flue gases determined by the drying requirements of the damp fuel.

6 Claims, 10 Drawing Sheets

PROCEDURE FOR IMPROVING THE EFFICIENCY OF A STEAM POWER PLANT PROCESS

This is a continuation of application Ser. No. 314,117, filed Feb. 15, 1989, now abandoned.

BACKGROUND OF THE INVENTION

The present invention concerns a procedure for improving the efficiency of a steam power plant process, in the process damp fuel is used which is dried by conducting at least part of the flue gas flow to dry the fuel.

Through the application DE No.-3 111 011 is known a procedure applied in a steam power plant process, in which preheating of the combustion air is effected with a calorifier. Cooling of the flue gases is effected with a flue gas air preheater (extra economizer). The aim of the procedure disclosed in this reference is to achieve good protection of the flue gas air preheaters (12) against sulphuric acid corrosion. The efficiency of the power plant process cannot be significantly increased with the apparatus design of the reference. No possibilities of control for controlling the ultimate flue gas temperature are disclosed in the reference. On the other hand no need of such control exists in the process described in the reference.

In the application DE No.-2 243 380 a power plant process is disclosed in which preheating of the combustion air is with the aid of water circulation, the feed water going to the water circulation being preheated with tapped steam. Moreover, flue gas cooling has been implemented with a partial feed water flow in this process. The aim in the process of the reference is primarily to separate the air and flue gas passages as regards layout. No significant improvement of the efficiency of the power plant process is achieved in the process of the reference. The reference also fails to disclose any so-called flue-gas air preheater ("Luvo"), i.e., a means in which the thermal energy carried by the flue gases is used to preheat the combustion air for the fuel of the boiler.

It is thus known in the prior art, and also through the references cited above, to improve the efficiency of a steam process by heating the feed water with steam tapped from the turbine. It is also known, though perhaps not as common, that preheating of the combustion air is also performed with tapped steam.

SUMMARY OF THE INVENTION

The procedure of the invention is mainly characterized in that in addition to the feed water the combustion air is also preheated in steam power plants with steams tapped from turbines, in back-pressure power plants with tapped steams and/or back pressure steams, and in area heating installations with tapped steams and/or remote heating water, and that the temperature of the flue gas going to the damp fuel dryer installation or the cooling of the flue gas flow by-passing it is controlled by drawing thermal energy from the flue gas and transferring it to the combustion air and/or to the feed water, the quantity and/or temperature of these being controlled in accordance with the cooling requirements of the flue gases determined by the drying requirements of the damp fuel.

Applying the teachings of the invention, a procedure has been implemented in which the temperature of the flue gas going to the dryer installation is controlled in accordance with the drying requirements of the wet fuel. Need of such control is particularly encountered when the fuel is dry peat. In the case of peat, the temperature of the flue gas going to the dryer varies in the range 220° C. to 650° C. The temperature normally required is over 300° C. In the case of said temperatures exceeding 300° C., flue gas cooling causes no problems. In that case all of the air as well as all of the feed water can be heated with steam tapped from the turbine or with back pressure steam of a back pressure power plant, or with remote heating water in an area heating power plant. If exceptionally high flue gas temperatures are needed, this is normally arranged such that part of the flue gases bypass a considerable part of the boiler's cooling heat surfaces. The possibilities of control afforded by the present invention are only needed when exceptionally low temperatures, i.e. under 300° C., are required. It is then necessary to forego part of the air or feed water preheating in order that cold enough air or feed water might be available in the last flue gas cooling step.

If the dryer installation is only dimensioned to use part of the flue gases, in this case, too, an arrangement for cooling the remainder is required in which there is available a given quantity of cold air or feed water, typically having a temperature below 100° C. The amount of this cooling requirement has to be controllable in direct proportion to the variation in quantity of the gas that has to be cooled.

In the procedure of the invention for improving the efficiency of a steam power plant process provided with damp fuel drying apparatus, at least part of the combustion air is preheated, in addition to the feed water, with tapped steam from the turbine without any increase of flue gas losses resulting therefrom. In the procedure of the invention the temperature of the flue gas going to the damp fuel dryer or the cooling of the flue gas partial flow by-passing the dryer is controlled. As taught by the invention, the control of the temperature of the flue gas going to the dryer can be carried out in a way which is optimal as regards energy householding. This control is carried out on the basis of the requirements imposed by the boiler loading and by the moisture content of the peat.

The invention is described in the following, referring to certain advantageous embodiments of the invention, presented in the figures of the attached drawings, yet to which the invention is not meant to be exclusively confined.

BRIEF DESCRIPTION OF THE DRAWINGS

In FIGS. 1 and 2 are depicted the presently prevailing damp fuel drying procedures in a power plant process, conforming to the state of art.

DESCRIPTION OF THE PREFERRED EMBODIMENTS

Figure 1:
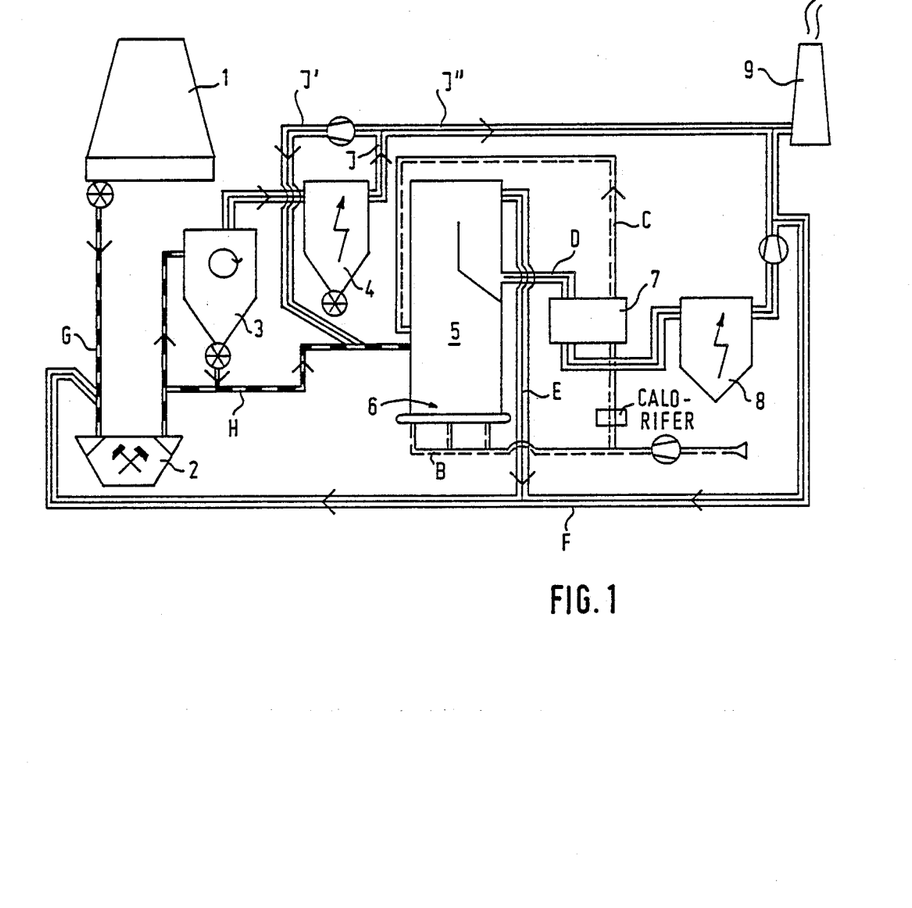
In FIG. 1 is depicted so-called modern mill drying and in FIG. 2, a so-called modern flash dryer.

In FIG. 1, a modern mill dryer installation is depicted. The fuel is conducted from a peat silo 1 to the mill 2. From the mill 2, the fuel is transported to cyclone separators 3 and 4. The combustion air is carried to the boiler 5 by the duct 8, to the vicinity of the grate 6 of the boiler 5. The greater part of the combustion air is branched off by the duct C, through a calorifier and air preheater 7 to the boiler 5. The flue gases are removed from the boiler by the ducts D and E. The duct D carries the flue gases through the air preheater 7 to electric filters 8, and further to the stack 9. The hot drying gas is carried by the duct E to the duct of the cold drying gas F, and these gases are carried to join the material flow G entering the mill 2. The fuel G is separated from the cyclone separators 3 and 4 and carried by the duct H to the boiler 5. From the cyclone 3, the flue gas is carried to the cyclone 4 and further to the duct I, from which a partial flow I' is branched off, back to join the material flow H going to the boiler, and the part I" is directed to go straight to the stack 9.

Figure 2:
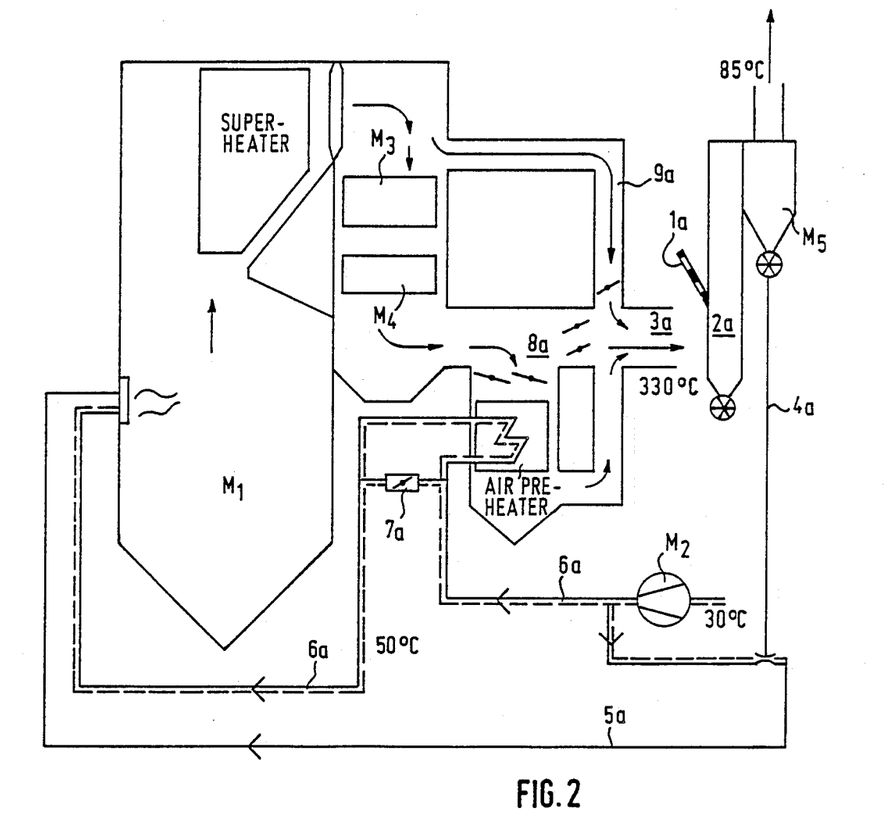

In FIG. 2, a modern flash dryer is depicted. The damp peat is introduced in the flash dryer 2a by the duct 1a. The dryer gas is introduced by the duct 3a. The peat dust is separated from the cyclone $M_5$ by the duct 4a. The peat dust and carrier air go by the duct 5a to the boiler $M_1$. The blower $M_2$ is used to transport the combustion air by the duct 6a to the air preheater and further to the boiler $M_1$, or part of the flow is by-passed through the by-pass 7a on the air side, to the combustion air duct 6a going straight to the boiler $M_1$. The reference numeral 8a in the figure indicates the gas-side by-pass of the air preheater. The by-pass of the superheater $M_3$ and economizer $M_4$ on the gas side is indicated by reference numeral 9a.

Figure 3:
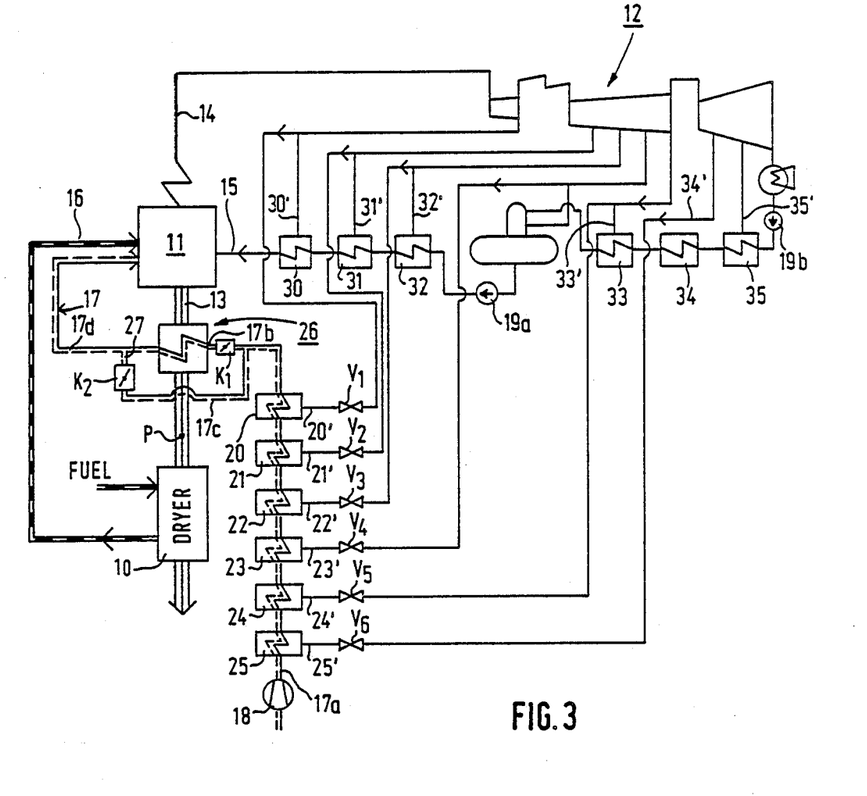
In FIG. 3, the procedure and apparatus of the present invention are depicted in schematical presentation, as well as an embodiment of the procedure and means of the invention in which all of the flue gas is conducted straight to the dryer installation.

In FIG. 3 are depicted the procedure and apparatus design of the invention wherein all flue gases from the boiler go to the dryer installation. In the figure the dryer installation is indicated with reference numeral 10, the boiler with 11, and a steam turbine or equivalent with 12. The flue gases from the boiler 11 are conducted by the duct 13 to the dryer installation 10, from which they are further conducted out through the stack. The fuel is introduced in the dryer installation 10, and the dried fuel is carried by the path 16 or equivalent to the boiler 11. The combustion air for the fuel is introduced by the duct 13 in the boiler 11. The feed water is carried to the boiler 11 by the duct 15, and the steam duct between boiler and turbine is denoted with reference numeral 14 in the figure. In the figure are also depicted, indicated with common reference numerals 20–25, combustion air preheaters, and the feed water preheaters have similarly been indicated with common reference numerals 30–35. The means causing air circulation is indicated with 18, and the action means producing feed water circulation are indicated with 19. In the process chart, the temperature control point in the flue gas flow is indicated with P. The feed water going to the boiler 11 is preheated with tapped steams 30', 31', 32', 33', 34', 35' from the turbine 12. The function of actual flue gas temperature control unit is provided by the combustion air preheating means 26 (Luvo) inserted in the flue gas duct and by the steam preheaters 20, 21, 22, 23, 24, 25 for air. The combustion air is by the aid of a blower 18 or equivalent carried through the heat exchangers 25–20 to the heat exchanger 26, or Luvo, disposed in the flue gas duct. The heat is recovered from the hot flue gas in the heat exchanger 26. In the heat exchangers 20–25 the temperature of the combustion air has been stepwise elevated with the aid of tapped steam flows 20'–25' from the turbine. The temperature at the points P of the flue gas flow going to the dryer installation 10 is controlled by controlling the temperature of the combustion air going to the air preheater 26. The regulating dampers $K_1$ and $K_2$ are used to control the quantity of combustion air going through the heat exchanger 26. At the same time the temperature of the flue gas in the flue gas duct 13, at the point P, is also controlled. By closing the damper $K_2$ and opening the damper $K_1$, the desired amount of air, depending on the opened position of the valve $K_1$, is caused to flow through the heat exchanger 26 by the duct 17b and the rest is caused to by-pass it through the by-pass duct 17c. A duct 17d leads from the branching point 27 after the air preheater 26, to the boiler 11.

Control in order to increase the cooling may, for instance, be accomplished in the following way. The damper $K_1$ is first closed and the damper $K_2$ opened until all air passes through the air preheater 26. The flue gas cooling is then increased by throttling the valve $V_1$ regulating the tapped steam flow 20' from the turbine 12. Hereby the temperature of the air going to the heat exchanger, or air preheater 26 in the flue gas duct 13 is lowered, and this increases the cooling of the flue gas. After the valve $V_1$ has been fully closed, the operation is continued by throttling and closing the valves $V_2$, $V_3$, $V_4$, $V_5$ and $V_6$, i.e., by taking the air preheaters out of operation one after the other, starting with the tapped steam branch carrying the highest pressure. When the fuel is peat, manipulation of three valves, $V_1$, $V_2$ and $V_3$, already suffices for adequate control.

The mode of control just described affords the advantage of good energy economy. The factors effecting some cost increase include the need of a heat exchanger, or air preheater, 26 and, particularly, the need to provide control means $K_1$ and $K_2$ in conjunction with said air preheater 26.

Figure 4:
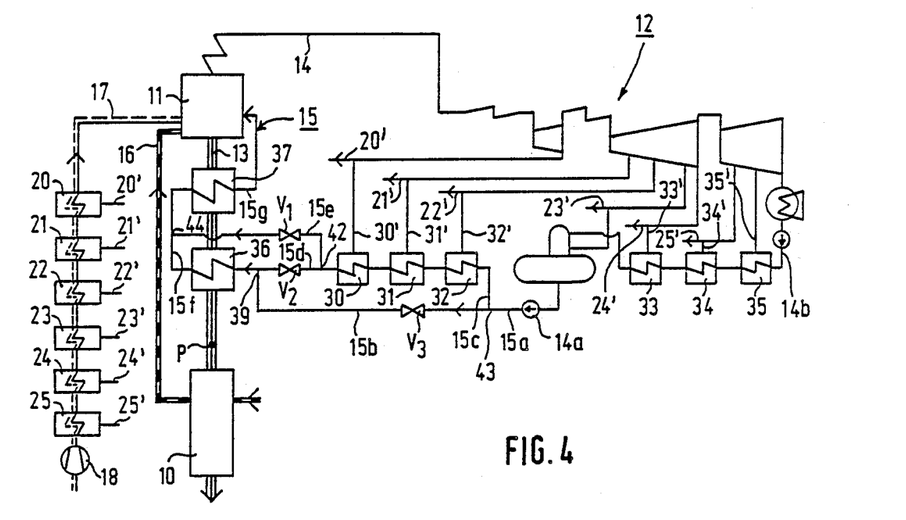
In FIG. 4 is presented a second embodiment of the procedure and apparatus of the invention.

In FIG. 4 is depicted another mode of control, and apparatus assembly, employed in the procedure of the invention. FIG. 4 presents a procedure and apparatus design in which likewise the total flue gas flow is conducted to the dryer installation 10 by the duct 13. The control aiming at regulating the temperature at the point P is carried out with the aid of feed water preheaters, or economizers, 36 and 37 disposed in the flue gas duct. The flue gas flow is in contact with the heat exchange surfaces between feed water and flue gases in the economizers 36 and 37, and the feed water has thus been arranged to take up heat from the flue gas. For controlling the flue gas temperature to be such as is desired, in view of the drying process, at the point P in the flue gas duct, one has to be able to control the water flow passing through the economizers, or feed water preheaters, 36 and 37 and/or its temperature.

This control may be implemented, for instance, as follows. The feed water valve $V_2$ is kept open to begin with, and the valves $V_1$ and $V_3$ are kept closed. This control is applied when a high flue gas temperature is needed at the point P, i.e., when high power is needed to dry the wet fuel. The economizers 36 and 37 operate in series, and all feed water passes through them at its maximum temperature. When the temperature at the point P has to be lowered, the requisite flue gas cooling effect is increased by closing the valve $V_2$ and opening valves $V_1$ and $V_3$ according to the cooling requirements. The cooling rate control in question can be steplessly accomplished by manipulating the valves $V_1$, $V_2$, $V_3$. In such control, part of the feed water by-passes the high pressure preheaters through the valve $V_3$, and the water in question arrives at the feed water preheater 36 with considerably lowered temperature. This enhances the cooling of the flue gases.

The feed water duct 15a divides at the point 43 into a duct section 15c and duct section 15b. The duct section 15b contains the valve $V_3$. The duct section 15c contains the steam preheaters 30, 31 and 32. The output of the steam preheater 30 communicates by the duct 15d with the valve $V_2$ and with the branching point 39 between duct 15d and duct 15b. A duct leads from the branching point 39 to the first economizer 36, from which a connecting duct 15f leads to the second economizer part 37, these economizer parts thus being connected in series. The duct 15g leads from the second economizer part 37 to the boiler 11. The duct 15f between the economizer parts 36 and 37 is joined at the branching 44 by the duct between branching points 44 and 42, which contains the valve $V_1$.

The advantage of the control system of FIG. 4 is its simple air and gas duct lay-out. No combustion air preheater operating on flue gas (Luvo) is needed. The design of FIG. 3 is less expensive in investment than that of FIG. 3, but it is inferior to the design of FIG. 3 in energy economy.

Preheating of the combustion air is in the design of FIG. 4 as taught by the invention, also by means of tapped steams. The combustion air is carried through the heat exchangers 25, 24, 23, 22, 21 and 20, in which the temperature of the combustion air is stepwise increased by carrying the tapped steams 20', 21', 22', 23', 24' and 25' from the turbine to said heat exchangers.

Figure 5:
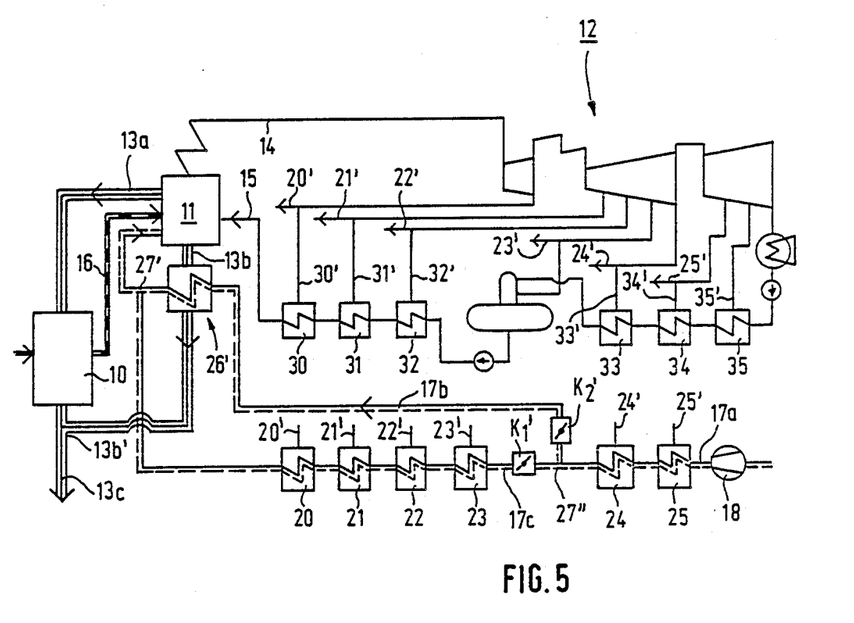
In FIG. 5 is presented a third advantageous embodiment of the procedure and apparatus of the invention, and an embodiment in which only part of the flue gases is conducted to the damp fuel dryer installation.

In FIG. 5 is depicted an embodiment of the invention in which only part of the flue gases is carried through the dryer installation 10 and in which only part of the flue gas is cooled in the dryer installation 10. The rest is carried through a side duct and cooled to temperature at removal about 115° C. The control of the dryer implies varying the flow rate of the gas flow A in the side duct 13b. Thermodynamically best results are obtained when the rate of cooling material flow, which is thus excluded from the preheating taking place with tapped steams, is controlled in proportion to the gas flow A that has to be cooled. In the design of the figure, part of the gas flow is carried by the flow duct 13a to the dryer installation 10, and the rest of the gas flow is carried by the duct 13b past the dryer installation 10 and further out through the stack. In the duct 13b has been inserted, between the boiler 11 and the branching point 13b' joining the flue gas duct 13c leading out from the dryer installation, a combustion air 26'. The feed water is preheated with the tapped steams 30', 31', 32', 33', 34', 35' by carrying the tapped steams from each stage of the turbine to the respective heat exchangers 30, 31, 32, 33, 34, 35.

The combustion air is similarly carried by the aid of a blower 18 or equivalent apparatus through the combustion air preheaters 25, 24, 23, 22, 21 and 20 to the output branch of the air preheater 26', to its branching point 27'. Preheating of the combustion air is accomplished with the tapped steams 20', 21', 22', 23', 24' and 25' from the turbine in similar fashion to feed water preheating. Between the combustion air preheaters 24 and 23 has been disposed a branching point 27" for the combustion air duct 17b going to the air preheater 26'. The dampers $K_1'$ and $K_2'$ control the combustion air passing through the air preheater 26', and therefore said dampers $K_1'$ and $K_2'$ control that combustion air flow which comes into contact with the heat surfaces of the air preheater 26' in the flue gas duct 13b and to which combustion air thermal energy of the flue gas is transferred.

Figure 6:
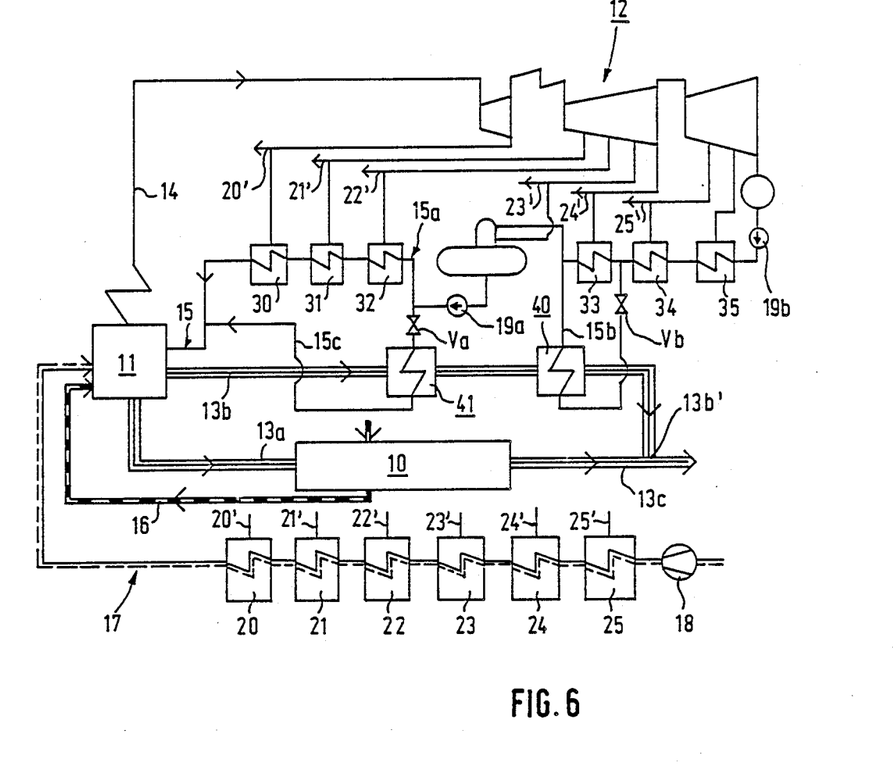
In FIG. 6 is presented a fourth embodiment of the invention, and an invention in which only part of the flue gas is conducted to the dryer installation.

In FIG. 6 is depicted an embodiment of the invention in which only part of the gas flow is carried through the dryer 10 and in which the whole combustion air quantity is preheated with the tapped steams 20', 21', 22', 23', 24', 25' from the turbine. Cooling of the flue gas flow A is accomplished with feed water in the economizers 40, 41 in the flue gas duct branch 13b. Part of the flue gas is conducted by the duct 13b past the wet fuel dryer installation 10, and the rest of the flue gas is carried by the duct 13a to the dryer installation 10, where thermal energy of the flue gas is utilized in drying the wet fuel. From the dryer installation 10 the flue gas is removed by the duct 13c in that the duct 13b joins the duct 13c over the branching point 13b'. Thus, both the fuel gases coming from the duct 13b and those coming from the duct 13c are removed through one single duct. In the flue gas duct 13b has been disposed at least one feed water preheater; advantageously two are provided: the preheaters 41 and 42. The feed water is conducted, pumped by a pump 19a, 19b or equivalent, through the feed water preheaters 35, 34, 33, 32, 31, 30. The temperature of the feed water is raised in said heat exchangers with the tapped steams 35', 34', 33', 32', 31' and 30 from the turbine. The valves $V_a$ and $V_b$ are used to control that feed water fraction which goes to the economizers 41 and 42, and therefore it is possible by controlling the feed water quantity passing through the economizers 41 and 42 also to control that thermal energy which transfers from the flue gas to the feed water, in other words, one may thus control the flue gas temperature and/or the feed water temperature to be as desired. The economizer 40, which is first in the direction in which the feed water travels, has been so disposed in the flue gas duct 13b that the economizer 40 has been connected to the input side and output side of the feed water preheater 33 through the duct 15b, in which further has been disposed a valve $V_b$ opening and closing the flow. The second economizer 41 is similarly disposed in the flue gas duct branch 13b in such manner that a by-pass branch 15c has been conducted from the steam preheating circuit 15a past the steam preheaters 30, 31, 32 and directly to the duct going to the boiler. In the by-pass branch 15c has been provided the valve $V_a$ closing and opening the flow.

By the procedure of the invention, e.g. in a condensing power plant savings amounting to about 6 MW are achieved when the size of the power plant is 150 MW. This is a relative saving of about 4%. This is based on the assumption that a flash dryer is used and that the fuel is damp peat. A further assumption is that full air preheating with tapped steam is applied, as presented in the foregoing figures.

Figure 7:
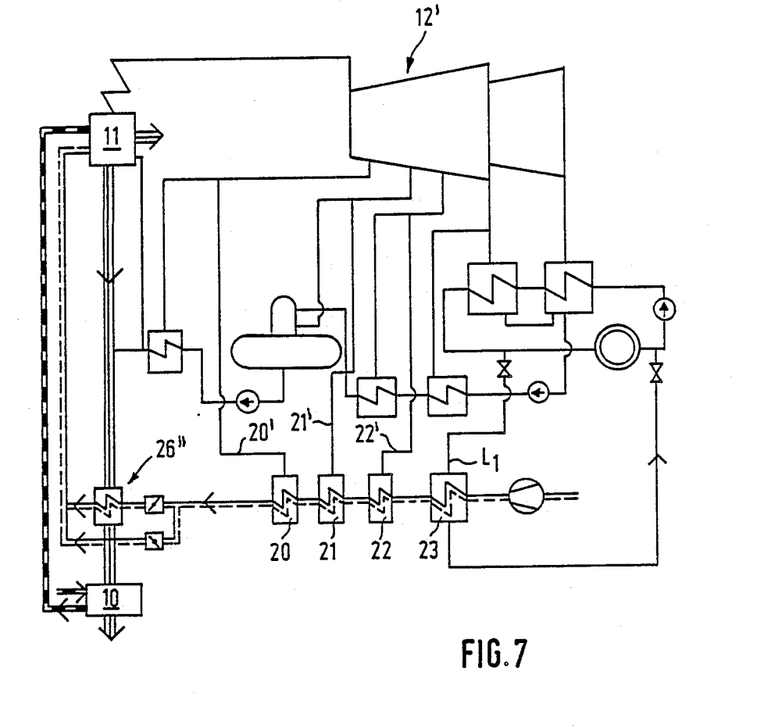
In FIG. 7 is presented an embodiment of the invention in which the combustion air is preheated not only with tapped steam but also with remote heating water of the area heating power plant.

In FIG. 7 is depicted an embodiment of the invention in which in an area heating power plant the preheating of the combustion air has been arranged to take place not only with tapped steam 20', 21', and 20' from the turbine 12' but also with remote heating water $L_1$. From the boiler 11, the flue gas is conducted to the dryer installation 10, and the flue gas temperature is controlled in a way similar to that in FIG. 3, with the aid of an air preheater 26''.

Figure 8:
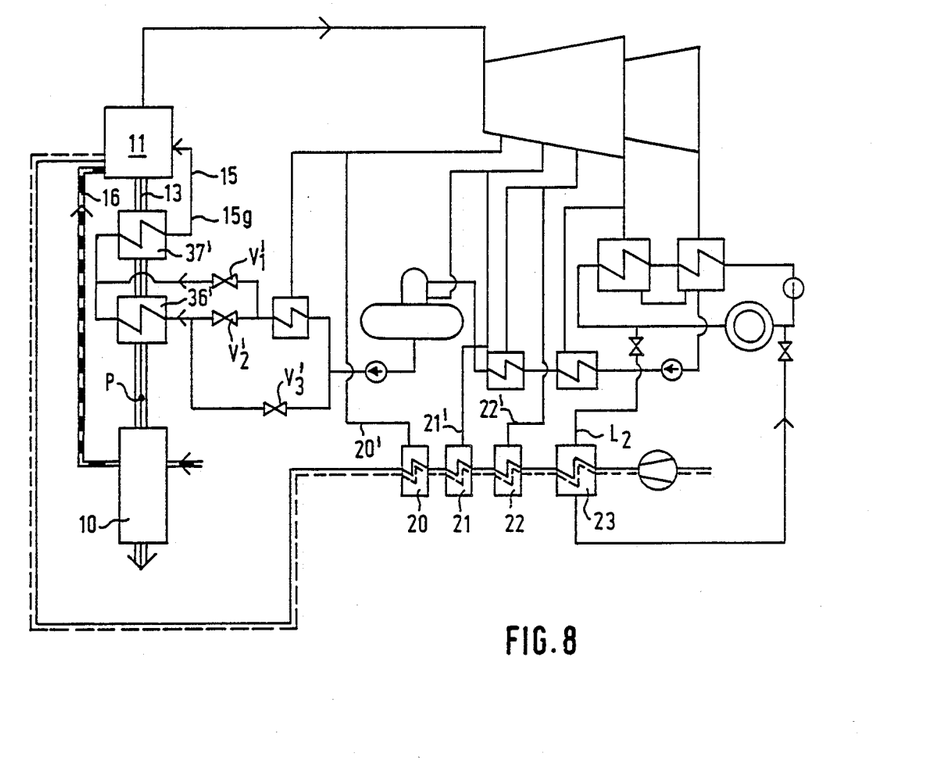
In FIG. 8 is presented an embodiment of the invention in which preheating of the combustion air is accomplished with tapped steam and remote heating water, and in which the temperature of the flue gas going to the dryer installation is controlled with the aid of economizers.

In FIG. 8 is depicted an embodiment of the invention in which once again the combustion air is preheated with remote heating water $L_2$ and with tapped steams 20', 21' and 20'' from a turbine. In this embodiment, all combustion air is conducted to the boiler 11 past the flue gas ducts, and the temperature at the point P of the flue gas going to the dryer installation 10 is controlled with the aid of economizers 36' and 37' in a way similar to that in the embodiment of FIG. 4.

Figure 9:
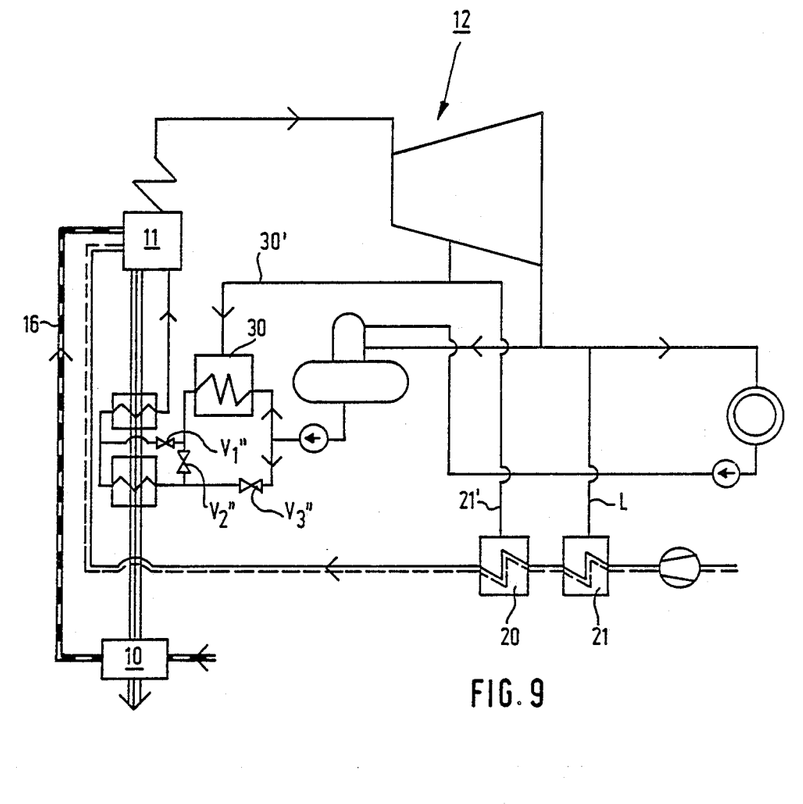
In FIG. 9 is presented an embodiment of the invention in which in a counter-pressure power plant preheating of the combustion air takes place with counter-pressure steam.

In the embodiment of FIG. 9, air preheating is, in addition to heating with tapped steam from a counter-pressure power plant turbine 12, also with counter-pressure steam L. In the embodiment of the figure, all preheated air is conducted directly past the flue gas duct to the boiler 11. The temperature of the flue gas going to the dryer installation is controlled in a manner similar to that in the embodiment of FIG. 4, with the aid of economizers 36', 37' disposed in the flue gas duct and by controlling the feed water flow with the aid of valves $V_1''$ and $V_2''$ and $V_3'''$.

Figure 10:
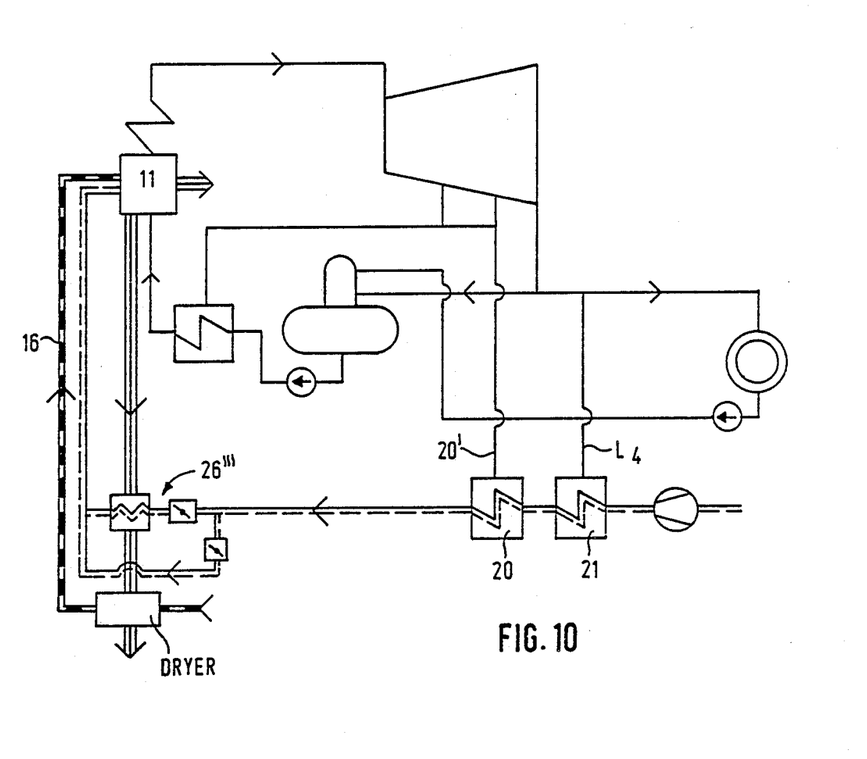
In FIG. 10 is presented an embodiment of the invention in which air preheating takes place in a counter-pressure power plant with counter-pressure steam, and in which the temperature of the flue gas going to the dryer installation is controlled with the aid of an air preheater ("Luvo").

In FIG. 10 is depicted an embodiment of the invention in which air preheating is carried out with tapped steam from the turbine 12 of a counter-pressure power plant and, in addition, with counter-pressure steam $L_4$. In this embodiment the preheated combustion air is conducted to an air preheater 26''', with the aid of which the temperature of the flue gas going to the dryer is controlled in similar manner as in the embodiment of FIG. 3.

Also conceivable are those embodiments of the procedure of the invention in which the apparatus arrangement is otherwise like that in FIGS. 5 and 6 except that the combustion air is preheated with tapped steam from a turbine and/or counter-pressure steam or with tapped steam from a turbine and/or remote heating water, as in the embodiments of FIGS. 7-10.

What is claimed:

1. A method for improving efficiency in a steam power plant, said method comprising the steps of:
   inputting damp fuel into a wet fuel dryer;
   conducting dried fuel from said dryer to a boiler;
   feeding combustion air into said boiler;
   feeding feed water into said boiler;
   feeding steam from said boiler to a turbine; and
   feeding at least part of at least one flue gas from said boiler through said dryer such that said flue gas or gases aid in drying said damp fuel;
   cooling the flue gas or gases being outputted from said boiler to said wet fuel dryer by using said feed water and/or combustion air;
   controlling the respective temperature or temperatures of said flue gas or gases being output from said boiler to said wet fuel dryer by controlling the temperatures or amounts of said combustion air and feed water being used for the cooling of said gases; and
   controlling the respective temperatures of said combustion air and said feed water by use of steam tapped from said turbine.

2. The method of claim 1 further comprising the steps of preheating said combustion air with tapped steams from a turbine and then raising the temperature of the combustion air by carrying the combustion air through a heat exchanger disposed in a flue gas duct, and cooling said flue gases by changing the temperature of the preheated air with tapped steams from the turbine.

3. The method of claim 1, further comprising controlling temperature of flue gas going to the wet fuel dryer installation by causing feed water to flow through a plurality of valves into a feed water preheater such that the temperature of the water going to a first economizer in the direction of water flow is lowered by directing part of the feed water past at lest one feed water economizer, and by directing the feed water totally or in part past said first economizer to a second economizer.

4. The method of claim 1, comprising conducting only part of the flue gas directly to the web fuel dryer and conducting part of the gas flow past the dryer in a bypass duct to a flue gas temperature control apparatus comprising a combustion air preheater such that the temperature of the flue gas passing through said by-pass duct can be controlled by controlling at least one of the parameters of quantity and temperature of the combustion air passing a combustion air preheater disposed in the flue gas duct.

5. The method of claim 1, comprising conducting only part of the flue gases to the wet fuel dryer and conducting another part through a side branch past the wet fuel dryer, said side branch having an at least bipartite feed water preheater, and controlling the temperature of the flue gas in accordance with the drying requirements of the damp fuel by controlling at least one of the parameters of quantity and temperature of the feed water taken from an intermediate point in the feed water preheating and caused to flow through at least one feed water preheater in a side branch.

6. The method of claim 2, comprising controlling the temperature at a specific point of the flue gas in the flue gas duct by causing part of the combustion air to flow past an air preheater disposed in the flow gas duct and using dampers for dividing the combustion air between a main duct and the bypass duct.

* * * * *